United States Patent
Koorapaty

(10) Patent No.: US 7,315,536 B2
(45) Date of Patent: Jan. 1, 2008

(54) UPLINK SYNCHRONIZATION IN A RADIO TELECOMMUNICATION SYSTEM

(75) Inventor: Havish Koorapaty, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 11/008,066

(22) Filed: Dec. 9, 2004

(65) Prior Publication Data

US 2006/0029031 A1    Feb. 9, 2006

Related U.S. Application Data

(60) Provisional application No. 60/600,001, filed on Aug. 9, 2004.

(51) Int. Cl.
*H04J 3/06* (2006.01)
(52) U.S. Cl. ...................... 370/350; 370/503
(58) Field of Classification Search ............... 370/350, 370/503; 455/265, 502, 20
See application file for complete search history.

(56) References Cited

U.S. PATENT DOCUMENTS

| | | | |
|---|---|---|---|
| 5,644,572 A * | 7/1997 | Olds et al. ................. | 370/324 |
| 6,016,322 A | 1/2000 | Goldman et al. | |
| 6,381,243 B1 * | 4/2002 | Ekstedt .................. | 370/395.62 |
| 6,477,151 B1 | 11/2002 | Oksala | |
| 7,006,534 B1 * | 2/2006 | Nemoto ..................... | 370/508 |
| 2002/0080749 A1 | 6/2002 | Terry | |
| 2003/0103475 A1 | 6/2003 | Heppe et al. | |
| 2005/0053099 A1 * | 3/2005 | Spear et al. ............... | 370/508 |

* cited by examiner

*Primary Examiner*—Matthew Anderson
*Assistant Examiner*—Angelica M. Perez

(57) ABSTRACT

A method and mobile station (MS) for synchronizing radio signal transmission times in a radiotelephone network. The MS measures a frame reception time for an nth frame, and obtains information regarding an offset between the times of transmission and reception of the nth frame. The MS then calculates a transmission time at the mobile station for the nth data frame using the timing offset information and the measured frame reception time. For a later mth frame, if new timing offset information has been received, the MS calculates a transmission time for the mth frame using the new information and the measured reception time for the mth frame. If new information has not been received, the MS calculates the transmission time based on the difference between the reception times of the nth and mth frames, the number of frames between the nth and mth frames, and the timing offset information obtained at the nth frame.

5 Claims, 2 Drawing Sheets

UPLINK SYNCHRONIZATION IN A RADIO TELECOMMUNICATION SYSTEM

RELATED APPLICATIONS

This application claims the benefit of the filing date of U.S. Provisional Patent Application No. 60/600,001 filed on Aug. 9, 2004, the disclosure of which is incorporated herein by reference.

BACKGROUND

The present invention relates to mobile radio telecommunication systems. More particularly, and not by way of limitation, the present invention is directed to a method of adjusting uplink transmit timing at each mobile station that enables synchronous reception at a base station.

In mobile radio telecommunication systems, propagation delays for transmissions from mobile stations vary due to differences in the distance of each mobile station (MS) from the receiving base station (BS). In many systems, such as the Global System for Mobile Communications (GSM), signals received at the BS are synchronized by providing periodic adjustments in transmit timing, known as timing advance (TA) values, to each MS. In other systems, especially Frequency Division Duplex (FDD) Code Division Multiple Access (CDMA) systems such as Wideband CDMA (WCDMA), no effort is made to synchronize uplink transmissions at the chip level, although coarse synchronization at the frame level is maintained. However, in some CDMA systems such as the Time Division Duplex Synchronous CDMA (TD-SCDMA) system being developed in China, an effort is made to synchronize transmissions on the uplink through the use of periodic transmit time adjustments for each mobile station. The TD-SCDMA system uses special codes designed to preserve orthogonality against multipath echoes within a certain time window around the time of reception of the signal at the BS, and hence can benefit from uplink synchronization. Uplink synchronization is a requirement, in general, for any TDD system regardless of its multiple access method.

As described above, prior systems have attempted to solve the problem of synchronizing received signals at the BS by periodically transmitting adjustments to each MS to adjust its transmit timing. For the first uplink transmission in a session, transmit timing is determined based on receive timing on the downlink. In some systems, such as GSM, a pre-defined offset from the time of reception of a slot on the downlink is used. In other systems, such as the TD-SCDMA system, the received power on the downlink slot is used to determined the offset between the transmit time and the receive time. The timing control for the first uplink transmission may be referred to as open-loop timing control. Once the MS starts transmissions, the BS monitors the time of reception of the signal transmitted by each MS. If a significant deviation from the required time of reception occurs for a given MS, a command to adjust transmit time is sent to that MS. This timing control may be referred to as closed-loop timing control.

There are several disadvantages of the existing solutions. A first disadvantage is that they require periodic control commands to the MSs to ensure uplink synchronization. In mobile radio telecommunication systems with larger cells and/or a large number of highly mobile MSs, this can result in a significant increase in signaling load. It would be advantageous to have a method of adjusting transmit timing at each MS, while minimizing the necessity for transmit time updates from the BS. A second disadvantage is that the initial estimate of transmit timing made during the open-loop timing control phase is not as accurate as desired. It would be advantageous to have a method of adjusting transmit timing at each MS that improves the initial estimate of transmit time during the open-loop timing control phase. The present invention provides such a method.

SUMMARY

In one aspect, the present invention is directed to a method of adapting radio signal transmission times at a mobile station to enable a base station to synchronously receive radio signals from a plurality of mobile stations. The method accounts for a varying propagation delay between the mobile station and the base station by performing the steps of measuring a frame reception time at the mobile station for an nth data frame; obtaining timing offset information regarding an offset between the time of transmission of the nth frame and the time of reception of the nth frame; and calculating by the mobile station, a transmission time at the mobile station for the nth data frame using the timing offset information and the measured frame reception time at the mobile station for the nth data frame. For an mth data frame later than the nth data frame, the mobile station determines whether new information on the offset between the times of transmission and reception has been received from the base station. If new timing offset information has been received, the mobile station calculates a transmission time at the mobile station for the mth data frame using the new timing offset information and the measured frame reception time at the mobile station for the mth data frame. However, if new timing offset information has not been received, the mobile station calculates the transmission time at the mobile station for the mth data frame based on a change in measured frame reception time between the reception time of the nth data frame and the reception time of the mth data frame, the number of data frames between the nth data frame and the mth data frame, and the timing offset information obtained at the nth data frame.

In another aspect, the present invention is directed to a method of synchronizing radio signal transmission times at a mobile station to radio signal reception times at a base station to account for a varying propagation delay between the mobile station and the base station. The method includes the steps of measuring a frame reception time at the mobile station for a data frame; determining whether position coordinates are available for the mobile station and the base station; and if position coordinates are available for the mobile station and the base station, calculating the propagation delay for the data frame using the position coordinates. The mobile station then calculates a transmission time at the mobile station for the data frame using the calculated propagation delay for the data frame and the measured frame reception time for the data frame.

In yet another aspect, the present invention is directed to a mobile station for communicating with a base station in a radiotelephone network. The mobile station includes means for measuring a frame reception time at the mobile station for an nth data frame; means for obtaining information from the base station regarding an offset between the time of transmission of the nth frame and the time of reception of the nth frame; and means for calculating a transmission time at the mobile station for the nth data frame using the timing offset information and the measured frame reception time at the mobile station for the nth data frame. The mobile station also includes means for determining whether new information on the offset between the times of transmission and reception has been received from the base station for an mth data frame later than the nth data frame, and if so, calculating a transmission time at the mobile station for the mth data frame using the new timing offset information and the measured frame reception time at the mobile station for the mth data frame. The mobile station also includes means, responsive to a determination that new timing offset information has not been received, for calculating the transmission time at the mobile station for the mth data frame based on a change in measured frame reception time between the reception time of the nth data frame and the reception time of the mth data frame, the number of data frames between the nth data frame and the mth data frame, and the timing offset information obtained at the nth data frame.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1:
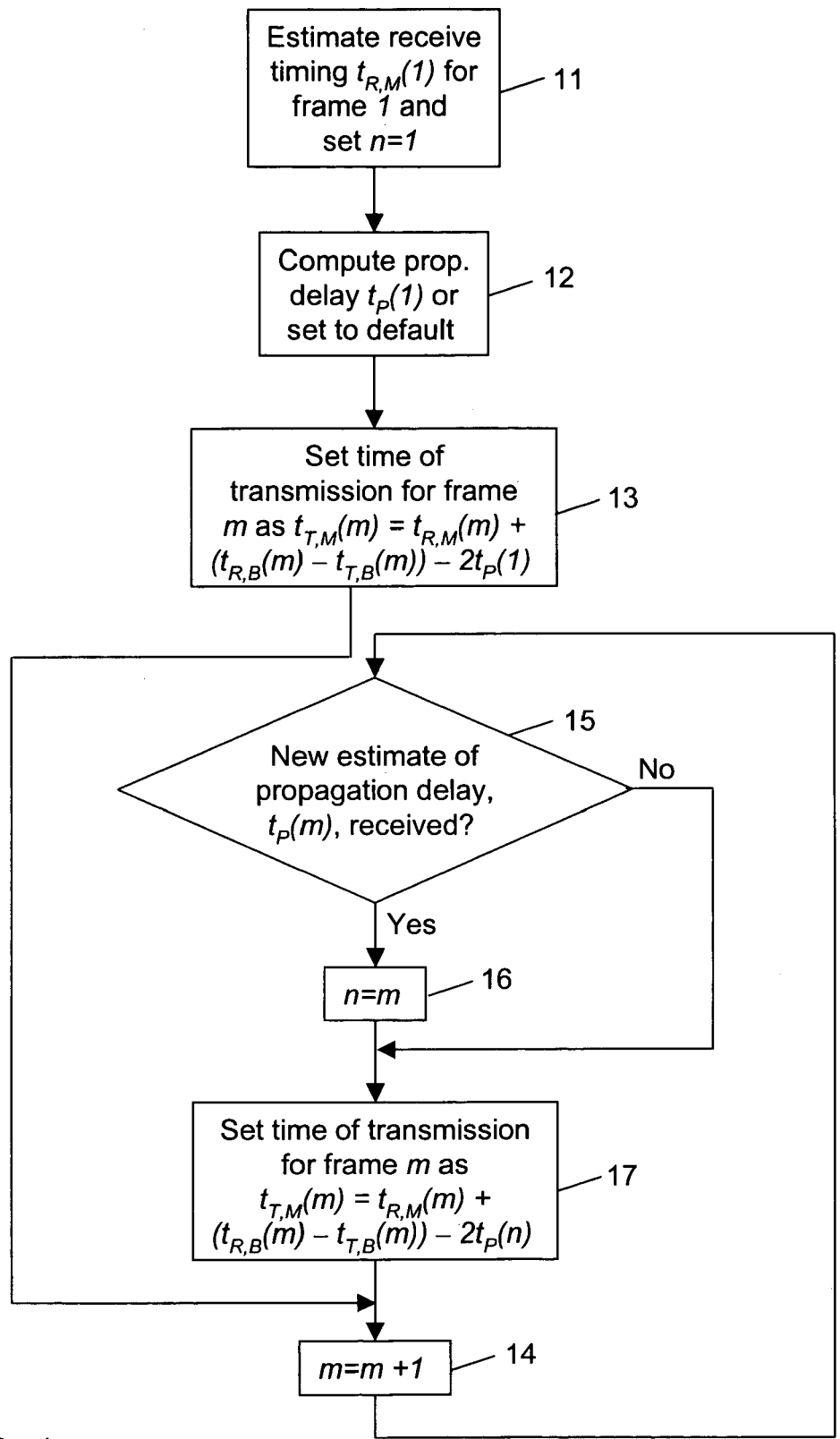
FIG. 1 (Prior Art) is a flow chart of a conventional method of maintaining uplink synchronization.

In accordance with the teachings of the present invention, an improved method of synchronizing uplink transmissions adjusts uplink transmit timing at each MS while minimizing the necessity for transmit time updates from the BS. The invention also improves the initial estimate of transmit time during the open-loop timing control phase. A peripheral advantage of the present invention is that it makes available, differences in times of reception at multiple base stations, which may be useful for the purpose of finding the position of the transmitting MS.

The present invention applies to a wireless communication system with multiple mobile stations being served by a base station, with varying MS-BS distances. Physical layer signals transmitted from the BS to the MS and vice-versa typically have a slot or frame structure, i.e., the signals are compartmentalized into time slots. The time of reception at the MS of a signal transmitted at the BS may be represented as follows:

$$t_{R,M}(n)+\delta(n)=t_{T,B}(n)+t_P(n), \quad (1)$$

where t represents an epoch such as the time of transmission of a signal; the subscripts "B" and "M" indicate BS and MS, respectively; and the subscripts "T" and "R" indicate transmission and reception, respectively. The argument, "n", indicates that the epoch correponds to the $n^{th}$ transmitted slot. Hence, $t_{R,M}(n)$ represents the time of reception at the MS, of a signal corresponding to the $n^{th}$ slot. The quantity $t_P(n)$ is the propagation delay between the BS and the MS at the time the $n^{th}$ slot is transmitted, and is proportional to the distance between the BS and the MS. In the description that follows, the $n^{th}$ slot is a slot that was received at some time in the past, and is the last slot for which an estimate of the propagation delay was received. The quantity $\delta(n)$ represents a bias value corresponding to the $n^{th}$ slot arising from imperfect synchronization between the MS and BS clocks. All time units described herein are referenced to the BS's clock.

In the same manner, the time of reception at the BS of a signal transmitted at the MS may be represented as follows:

$$t_{R,B}(n)=t_{T,M}(n)+t_P(n)+\delta(n). \quad (2)$$

In order to maintain uplink synchronization between all MSs, the difference between the times of transmission and reception at the BS for all MSs, for each slot, should be the same. That is, $$t_{R,B}(n)-t_{T,B}(n)=\lambda, \text{ for all } n. \quad (3)$$

Since, the difference in times of transmission between consecutive slots is the same, the above property implies that the difference between the times of reception of consecutive slots, at the BS, should also be the same. That is, for a past slot n and a current slot m, $$t_{R,B}(m)-t_{R,B}(n)=\Delta\cdot(m-n)=t_{T,B}(m)-t_{T,B}(n), \text{ for all } m>n. \quad (4)$$

From (1) and (2) the time of transmission at the MS, for slot n, may be represented as:

$$t_{T,M}(n) = t_{R,M}(n) + (t_{R,B}(n) - t_{T,B}(n)) - 2t_P(n), \quad (5)$$
$$= t_{R,M}(n) + \lambda - 2t_P(n).$$

The quantity $(t_{R,B}(n)-t_{T,B}(n))=\lambda$ is a known system parameter and hence, the only unknown is the propagation delay $t_P(n)$. In the prior art, the estimate $\hat{t}_P(n)$ of the propagation delay, $t_P(n)$, is implicitly sent to the MS by the BS, by sending an estimate of the parameter $\lambda-2t_P(n)$, also known as the timing advance (TA). In conventional systems, if this TA parameter is not updated, the time of transmission at the MS for a later slot, m>n, is given by:

$$t_{T,M}(m)=t_{R,M}(m)+\lambda-2\hat{t}_P(n), \quad (6)$$

that is, the MS uses the previously received estimate of the propagation delay.

FIG. 1 is a flow chart of the conventional method of maintaining uplink synchronization. The variable n represents a slot that was received at some time in the past, and is the last slot for which an estimate of the propagation delay was received. The variable m represents the current slot for which a time of transmission is being calculated. At step 11, the method estimates the receive timing at the MS, $t_{R,M}(1)$ for frame 1, and n is set equal to 1. At step 12, the method computes the propagation delay, $t_P(1)$, using RSS measurements, or sets the propagation delay to a default value. At step 13, the time of transmission at the MS for frame m is set as:

$$t_{T,M}(m)=t_{R,M}(m)+(t_{R,B}(m)-t_{T,B}(m))-2t_P(1).$$

At step 14, the slot number m is then incremented to m+1 for the next slot. At step 15, it is determined whether or not a new estimate of the propagation delay for the $m^{th}$ slot, $t_P(m)$, has been received. If so, the method moves to step 16 where the slot when the latest estimate of the propagation delay was received is updated by setting n equal to m. The method then moves to step 17 and calculates the time of transmission at the MS for frame m, $t_{T,M}(m)$, using the updated propagation delay and the equation:

$$t_{T,M}(m)=t_{R,M}(m)+(t_{R,B}(m)-t_{T,B}(m))-2t_P(n)$$

However, if it is determined at step 15 that a new estimate of the propagation delay, $t_P(m)$, has not been received, then n is not changed, and the method moves directly to step 17 where the time of transmission at the MS for frame m is calculated using the old propagation delay from frame n.

The method then returns to step 14 and increments m to m+1. The method then repeats the process for each frame. Note that if a new estimate of the propagation delay is not received, the calculation in step 17 results in the same $t_{T,M}(m)$ as was calculated previously, and thus the system continues to utilize the same $t_{T,M}(m)$ for succeeding frames if an updated estimate of the propagation delay is not received.

The present invention, on the other hand, estimates a new propagation delay when one is not received from the network, and uses the new estimated propagation delay to calculate a new time of transmission at the MS for frame m, $t_{T,M}(m)$. Thus, rather than continuing to utilize the same $t_{T,M}(m)$ for succeeding frames, the invention derives the transmission time for a particular frame by estimating a change in propagation delay from the time the previous update was received from the network. From equations (1) and (4) above, it is seen that the change in propagation delay from frame n to frame m, (i.e., $t_P(m)-t_P(n)$), is given by:

$$t_P(m)-t_P(n)=(t_{R,M}(m)-t_{R,M}(n))+(\delta(m)-\delta(n))-(m-n)\cdot\Delta, \quad (7)$$

where $\Delta$ is the difference in receive (or transmit) times for consecutive time slots at the base station.

From equations (5) and (7), the correct transmission time for slot m at the MS can be represented as:

$$\begin{aligned} t_{T,M}(m) &= t_{R,M}(m) + \lambda - 2(t_P(n) + (t_{R,M}(m) - t_{R,M}(n)) + \\ &\quad (\delta(m)-\delta(n)) - (m-n)\cdot\Delta), \\ &= -t_{R,M}(m) + 2t_{R,M}(n) + \lambda - 2[t_P(n) + (\delta(m)-\delta(n)) - \\ &\quad (m-n)\cdot\Delta]. \end{aligned} \quad (8)$$

Accordingly, the algorithm for generating the transmit time for slot m, given that the last update for propagation delay was received for slot n, may be represented as:

$$t_{T,M}(m)=t_{R,M}(m)+2t_{R,M}(n)+\lambda-2[\hat{t}_P(n)-(m-n)\cdot\Delta], \quad (9)$$

where all the quantities on the right-hand side of the equation are known. It should be noted that if an updated estimate of propagation delay is received from the network for slot m, (i.e., n=m), the above expression reduces to the time of transmission using the prior art algorithm given in equation (6) above, i.e.:

$$t_{T,M}(m)=t_{R,M}(m)+\lambda-2\hat{t}_P(m) \quad (9a)$$

with the exception that the updated propagation delay for slot m is utilized. If an updated estimate of propagation delay is not received from the network for slot m, equation (9) can be written in the form:

$$t_{T,M}(m)=t_{R,M}(m)+\lambda-2[\hat{t}_P(n)+\{t_{R,M}(m)-t_{R,M}(n)\}-(m-n)\cdot\Delta]. \quad (9b)$$

From this form of the equation, it can be easily seen that the estimated propagation delay for the $n^{th}$ slot, is updated for the $m^{th}$ slot by calculating a difference between the reception times at the MS for the $m^{th}$ slot and the $n^{th}$ slot, and then subtracting the known time difference between the $m^{th}$ slot and the $n^{th}$ slot.

Comparing equations (8) and (9), the sources of potential error are the quantity, $(\delta(m)-\delta(n))$, and any error in the propagation delay estimate $\hat{t}_P(n)$. The propagation delay estimate, $\hat{t}_P(n)$, is computed at the BS, and hence its accuracy is expected to satisfy the BS's requirements. Thus errors in this estimate are not of concern. It is shown in the following that the effect of the quantity $(\delta(m)-\delta(n))$ on the transmission time is insignificant.

Typically, the MS locks onto the carrier frequency of the BS using an automatic frequency control (AFC) unit and hence maintains very close time and frequency synchronization with the BS clock reference. However, there is some variation in the frequency of the clock in the MS with respect to the BS. The variation depends on the tolerances specified in the standard, but is typically, at most, a few hundred hertz instantaneously. If the frequency offset between the clocks were to remain constant, or always have the same sign, there would be a drift in timing over a period of many frames. For example, for WCDMA, the rate of drift in timing for a 200 Hz constant offset would be approximately $5\times10^{-4}$ chips every millisecond. Hence the drift over the period of a frame is insignificant, although the drift over a long period such as one second could be half a chip. In practice, however, the frequency of the MS clock drifts around the true BS frequency as the AFC loop tries to track the BS clock frequency. Thus, the sign of the frequency offset varies, canceling out the difference over time rather than building up in one direction. Therefore, the long term drift is insignificant.

Thus, the quantity $(\delta(m)-\delta(n))$ is very small even over a large number of frames, m-n. It should be noted that references herein to the BS or MS clock are loosely referring to the whole clock generation circuitry that generates the carrier frequency at the BS and the MS. It is also assumed that symbol timing is generated using the same clock source so that timing and frequency errors are related, both in the BS and the MS.

According to another aspect of the present invention, the initial estimate of the propagation delay for the very first frame may be derived from position estimates of the MS and the BS if these are available. For example, in an MS with a GPS receiver, the position of the MS may be known at the time the session is initiated for uplink transmission. If the BS co-ordinates are also known from broadcast control transmissions on the downlink, or from information available to the MS in a previous point-to-point transaction, the propagation delay can be estimated as the distance between the MS and the BS divided by the speed of light. While this estimate may be inaccurate due to lack of line-of-sight propagation, it is expected to be far more accurate than either using a default value provided by the network, or using received signal strength (RSS) measurements as is specified in the prior art for TD-CSDMA.

Figure 2:
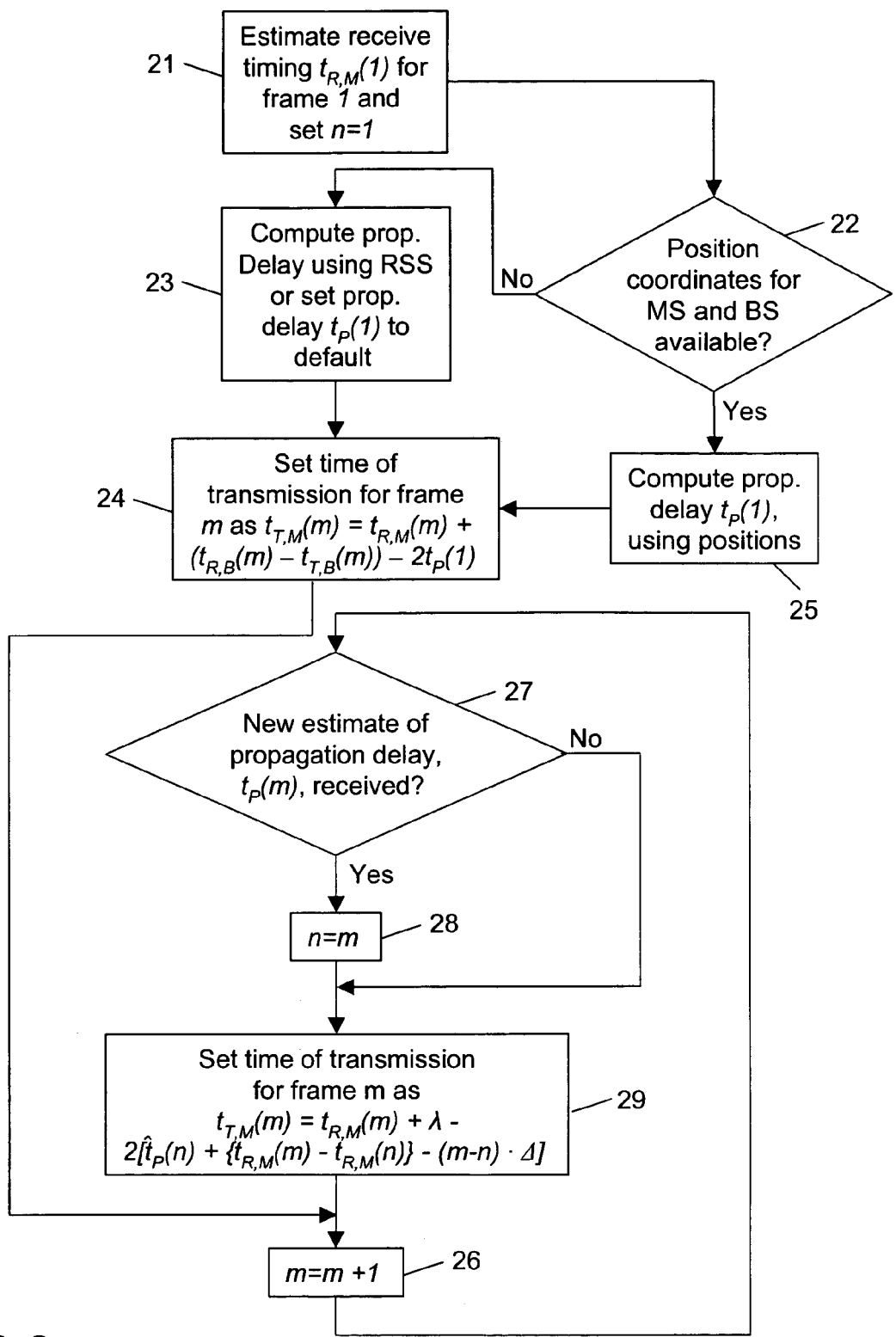
FIG. 2 is a flow chart of a method of maintaining uplink synchronization according to the preferred embodiment of the present invention.

FIG. 2 is a flow chart illustrating the steps of the preferred embodiment of the method of the present invention. At step 21, the method estimates the receive timing at the MS, $t_{R,M}(1)$ for frame t, and n is set equal to 1. At step 22, it is determined whether or not position coordinates are available for the MS and the BS. If not, the method moves to step 23 and computes the propagation delay, $t_P(1)$, using RSS measurements, or sets the propagation delay to a default value. At step 24, the time of transmission at the MS for frame m is set as: $t_{T,M}(m)=t_{R,M}(m)+(t_{R,B}(m)-t_{T,B}(m))-2t_P(1)$. However, if at step 22 it is determined that position coordinates are available for the MS and the BS, the method computes the propagation delay, $t_P(1)$, using the MS and BS positions at step 25 prior to moving to step 24.

The method then moves to step 26 where the slot number m is then incremented to m+1. At step 27, it is determined whether or not a new estimate of the propagation delay, $t_P(m)$, has been received. If so, the method moves to step 28 where n is set equal to m. The method then moves to step 29. However, if it is determined at step 27 that a new estimate of the propagation delay, $t_p(m)$, has not been received, then n is not changed, and the method moves directly to step 29. At step 29, the time of transmission at the MS for frame m is set as:

$$t_{T,M}(m) = t_{R,M}(m) + \lambda - 2[\hat{t}_P(n) + \{t_{R,M}(m) - t_{R,M}(n)\} - (m-n)\cdot\Delta].$$

The method then returns to step 26 and increments m to m+1. The method then repeats the process for each frame, thereby ensuring that new propagation delay estimates are utilized when received, or old propagation delay estimates are updated based on the number of frames received since the old propagation delay estimate was received.

The inventive method of deriving the time of transmission significantly reduces the frequency with which the system must update MSs with the latest propagation delay. In theory, only an initial update is required, with no updates being necessary afterward. However, for robustness, it may be desirable to send future updates to guard against the effect of erroneous time-of-reception estimates at the MS.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of adapting radio signal transmission times at a mobile station to enable a base station to synchronously receive radio signals from a plurality of mobile stations, said method accounting for a varying propagation delay between the mobile station and the base station, said method comprising the steps of:

measuring a frame reception time at the mobile station for an nth data frame;

obtaining timing offset information regarding an offset between the time of transmission of the nth frame and the time of reception of the nth frame;

calculating by the mobile station, a transmission time at the mobile station for the nth data frame using the timing offset information and the measured frame reception time at the mobile station for the nth data frame;

for an mth data frame later than the nth data frame, determining by the mobile station whether new information on the offset between the times of transmission and reception has been received from the base station;

if new timing offset information has been received, calculating by the mobile station, a transmission time at the mobile station for the mth data frame using the new timing offset information and the measured frame reception time at the mobile station for the mth data frame;

if new timing offset information has not been received, calculating by the mobile station, the transmission time at the mobile station for the mth data frame based on a change in measured frame reception time between the reception time of the nth data frame and the reception time of the mth data frame, the number of data frames between the nth data frame and the mth data frame, and the timing offset information obtained at the nth data frame, wherein:

$$t_{T,M}(m) = t_{R,M}(m) + \lambda - 2[\hat{t}_P(n) + \{t_{R,M}(m) - t_{R,M}(n)\} - (m-n)\cdot\Delta],$$

where:

T and R indicate transmission and reception, respectively;

M indicates the mobile station;

$\lambda$ indicates the quantity $(t_{R,B}(n) - t_{T,B}(n))$, which is a known system parameter;

$\hat{t}_P(n)$ indicates a propagation delay estimate for the nth data frame; and $\Delta$ is the difference in receive (or transmit) times for consecutive time slots at the base station; and transmitting the mth data frame from the mobile station at the calculated transmission time.

2. The method of claim 1, wherein the step of obtaining timing offset information includes the steps of:

determining whether position coordinates are available for the mobile station and the base station; and if position coordinates are available for the mobile station and the base station, calculating the propagation delay between the mobile station and base station using the position coordinates, and calculating the timing offset information based on the propagation delay.

3. The method of claim 1, wherein the step of obtaining timing offset information includes receiving the timing offset information from the base station.

4. The method of claim 1, wherein the step of calculating by the mobile station, a transmission time at the mobile station for the nth data frame uses the equation:

$$t_{T,M}(n) = t_{R,M}(n) + (t_{R,B}(n) - t_{T,B}(n)) - 2t_P(1),$$

where:

T and R indicate transmission and reception, respectively;

B and M indicate the base station and the mobile station, respectively; and $t_P(1)$ indicates the propagation delay calculated for the first data frame.

5. A mobile station for communicating with a base station in a radiotelephone network, said mobile station comprising:

means for measuring a frame reception time at the mobile station for an nth data frame;

means for obtaining information from the base station regarding an offset between the time of transmission of the nth frame and the time of reception of the nth frame;

means for calculating a transmission time at the mobile station for the nth data frame using the timing offset information and the measured frame reception time at the mobile station for the nth data frame;

means for determining by the mobile station whether new information on the offset between the times of transmission and reception has been received from the base station for an mth data frame later than the nth data frame;

means, responsive to a determination that new timing offset information has been received, for calculating a transmission time at the mobile station for the mth data frame using the new timing offset information and the measured frame reception time at the mobile station for the mth data frame; and means, responsive to a determination that new timing offset information has not been received, for calculating the transmission time at the mobile station for the mth data frame based on a change in measured frame reception time between the reception time of the nth data frame and the reception time of the mth data frame, the number of data frames between the nth data frame and the mth data frame, and the timing offset information obtained at the nth data frame, wherein:

$$t_{T,M}(m) = t_{R,M}(m) + \lambda - 2[\hat{t}_P(n) + \{t_{R,M}(m) - t_{R,M}(n)\} - (m-n)\cdot\Delta],$$

where:
T and R indicate transmission and reception, respectively;
M indicates the mobile station;
$\lambda$ indicates the quantity $(t_{R,B}(n) - t_{T,B}(n))$, which is a known system parameter;
$\hat{t}_P(n)$ indicates a propagation delay estimate for the nth data frame; and
$\Delta$ is the difference in receive (or transmit) times for consecutive time slots at the base station.

* * * * *